United States Patent
Mola

(10) Patent No.: US 10,565,087 B2
(45) Date of Patent: Feb. 18, 2020

(54) TENTATIVE EXECUTION OF CODE IN A DEBUGGER

(71) Applicant: MICROSOFT TECHNOLOGY LICENSING, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 247 days.

(21) Appl. No.: 15/667,752

(22) Filed: Aug. 3, 2017

(65) Prior Publication Data

US 2019/0042396 A1 Feb. 7, 2019

(51) Int. Cl.
*G06F 11/34* (2006.01)
*G06F 11/36* (2006.01)

(52) U.S. Cl.
CPC ...... *G06F 11/3461* (2013.01); *G06F 11/3457* (2013.01); *G06F 11/36* (2013.01); *G06F 11/3624* (2013.01); *G06F 11/3636* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 7,958,497 B1 | 6/2011 | Lindo et al. | |
| 8,402,318 B2* | 3/2013 | Nieh | G06F 11/3419 714/15 |
| 8,560,991 B1 | 10/2013 | Fuss | |
| 9,317,297 B2* | 4/2016 | Gottschlich | G06F 11/3664 |
| 2006/0026582 A1 | 2/2006 | Collard et al. | |
| 2006/0206873 A1 | 9/2006 | Argade | |
| 2006/0288332 A1 | 12/2006 | Sagar et al. | |
| 2007/0288902 A1 | 12/2007 | Lev et al. | |
| 2015/0301806 A1 | 10/2015 | Leon et al. | |
| 2016/0335172 A1 | 11/2016 | Smith et al. | |
| 2018/0032320 A1* | 2/2018 | Aldea Lopez | G06F 8/34 |

OTHER PUBLICATIONS

Lewis, Bil, "Debugging Backwards in Time", In Proceedings of the Fifth International Workshop on Automated Debugging (AADEBUG 2003), Oct. 9, 2003.

(Continued)

*Primary Examiner* — Francisco J Aponte
*Assistant Examiner* — Mark A Gooray
(74) *Attorney, Agent, or Firm* — Workman Nydegger

(57) ABSTRACT

Tentatively executing an entity includes performing a first, execution of an entity. At a point in the first execution, the first execution is suspended and input specifying an alternate value for a runtime data element is received. Based on the input, a second execution of the entity is performed starting at the point in the first execution, while enabling the first execution to be later resumed unaffected by the second execution. This second execution includes setting the runtime data element to the alternate value, and emulating one or more memory writes performed by the entity during the second execution. The first execution of the entity could comprise a live execution, an execution that is based on trace data, an execution based on a process dump, etc.

20 Claims, 5 Drawing Sheets

(56) References Cited

OTHER PUBLICATIONS

Lewis, Bil, "Omniscient Debugger User Manual", Retrieved Form: http://omniscientdebugger.github.io/ODBUserManual.html, Dec. 29, 2006, 16 Pages.

"International Search Report and Written Opinion Issued in PCT Application No. PCT/US2018/035517", dated Oct. 5, 2018, 20 Pages.

Zamfir, et al., "Execution Synthesis: A Technique for Automated Software Debugging", In Proceedings of 5th European Conference on Computer Systems, Apr. 13, 2010, pp. 321-334.

"Debugging with Xcode", https://developer.apple.com/library/content/documentation/DeveloperTools/Conceptual/debugging_with_xcode/chapters/quickstart.html, Published on: Sep. 13, 2016, 13 pages.

Liu, et al., "Statistical Debugging: A Hypothesis Testing-Based Approach", In IEEE Transactions on Software Engineering, vol. 32, No. 10, Oct. 2006, pp. 1-17.

Honarmand, et al., "Replay Debugging: Leveraging Record and Replay for Program Debugging", In Proceedings of 41st International Symposium on Computer Architecture, Jun. 14, 2014, 12 pages.

Fidge, C. J., "Partial Orders for Parallel Debugging", In Proceedings of ACM SIGPLAN and SIGOPS Workshop on Parallel and Distributed Debugging, May 5, 1988, pp. 183-194.

Bronevetsky, et al, "AutomaDeD: Automata-Based Debugging for Dissimilar Parallel Tasks", In Proceedings of International Conference on Dependable Systems and, Jun. 28, 2010, 13 pages.

* cited by examiner

TENTATIVE EXECUTION OF CODE IN A DEBUGGER

BACKGROUND

When writing code during the development of software applications, developers commonly spend a significant amount of time "debugging" the code to find runtime and other source code errors. In doing so, developers may take several approaches to reproduce and localize a source code bug, such as observing the behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

BRIEF SUMMARY

Embodiments herein improve on debugging experiences by providing debugger capabilities of tentatively executing code. Tentatively executing code enables debuggers to provide answers to "what if?" questions when debugging an executable entity. For example, while executing an entity, the debugger may suspend execution at a point in time, such as at a breakpoint. There, the debugger can present various execution state, such as the values of registers, the values of variables, and/or the values of other runtime data elements. According to embodiments herein, the debugger is also enabled to take user input to modify one or more of these values. Then, the debugger can conduct a tentative execution of the entity utilizing the changed value(s) and the trace file. When doing so, the debugger isolates state of the tentative execution from original execution state, so that the tentative execution can be discarded and execution can be resumed from the suspension point using the normal value(s) without consequence to the original replay state. Accordingly, these embodiments enable a user to engage in "what if" hypotheticals to see how execution might deviate (or have deviated) based on changing portions of program state. Embodiments enable tentative execution to be performed on an entity that is being executed based on a trace file (i.e., a replay of the entity in a "time travel" debugging session), on an entity that is executing live (i.e. an original execution of the entity in a live debugging session), on an entity that is executing based on state obtained from a process dump, etc.

In some embodiments, a method for tentatively executing an entity includes performing a first execution of the entity. The method also includes, at a point in the first execution of the entity, suspending the first execution of the entity, and identifying a runtime data element used by the entity. The runtime data element has a first value based on the replayed execution. The method also includes receiving input specifying a second, different, value for the runtime data element. Based on this input, the method also includes performing a second execution of the entity starting at the point in the first execution, while enabling the first execution to be later resumed unaffected by the second execution. Performing the second execution includes setting the runtime data element to the second value, and emulating one or more memory writes performed by the entity during the second execution.

In other embodiments that operate in the context of "time travel" debugging, a method for tentatively executing a traced entity includes performing a first execution of the entity. The first execution comprises a replayed execution of the entity, based on utilizing one or more trace data streams to supply inputs to the entity. The one or more trace data streams were recorded during a prior execution of the entity. The method also includes, at a point in the first execution of the entity, suspending the first execution of the entity, and identifying a runtime data element used by the entity. The runtime data element has a first value based on the replayed execution. The method also includes receiving input specifying a second, different, value for the runtime data element. Based on this input, the method also includes performing a second execution of the entity starting at the point in the first execution, while enabling the first execution to be later resumed unaffected by the second execution. Performing the second execution includes setting the runtime data element to the second value, utilizing the one or more trace data streams to supply inputs to the entity, and emulating one or more memory writes performed by the entity during the second execution.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments herein improve on debugging experiences by providing debugger capabilities of tentatively executing code. Tentatively executing code enables debuggers to provide answers to "what if?" questions when debugging an executable entity. For example, while executing an entity, the debugger may suspend execution at a point in time, such as at a breakpoint. There, the debugger can present various execution state, such as the values of registers, the values of variables, and/or the values of other runtime data elements. According to embodiments herein, the debugger is also enabled to take user input to modify one or more of these values. Then, the debugger can conduct a tentative execution of the entity utilizing the changed value(s) and the trace file. When doing so, the debugger isolates state of the tentative execution from original execution state, so that the tentative execution can be discarded and execution can be resumed from the suspension point using the normal value(s) without consequence to the original replay state. Accordingly, these embodiments enable a user to engage in "what if" hypotheticals to see how execution might deviate (or have deviated) based on changing portions of program state. Embodiments enable tentative execution to be performed on an entity that is being executed based on a trace file (i.e., a replay of the entity in a "time travel" debugging session), on an entity that is executing live (i.e. an original execution of the entity in a live debugging session), on an entity that is executing based on state obtained from a process dump, etc.

Figure 1:
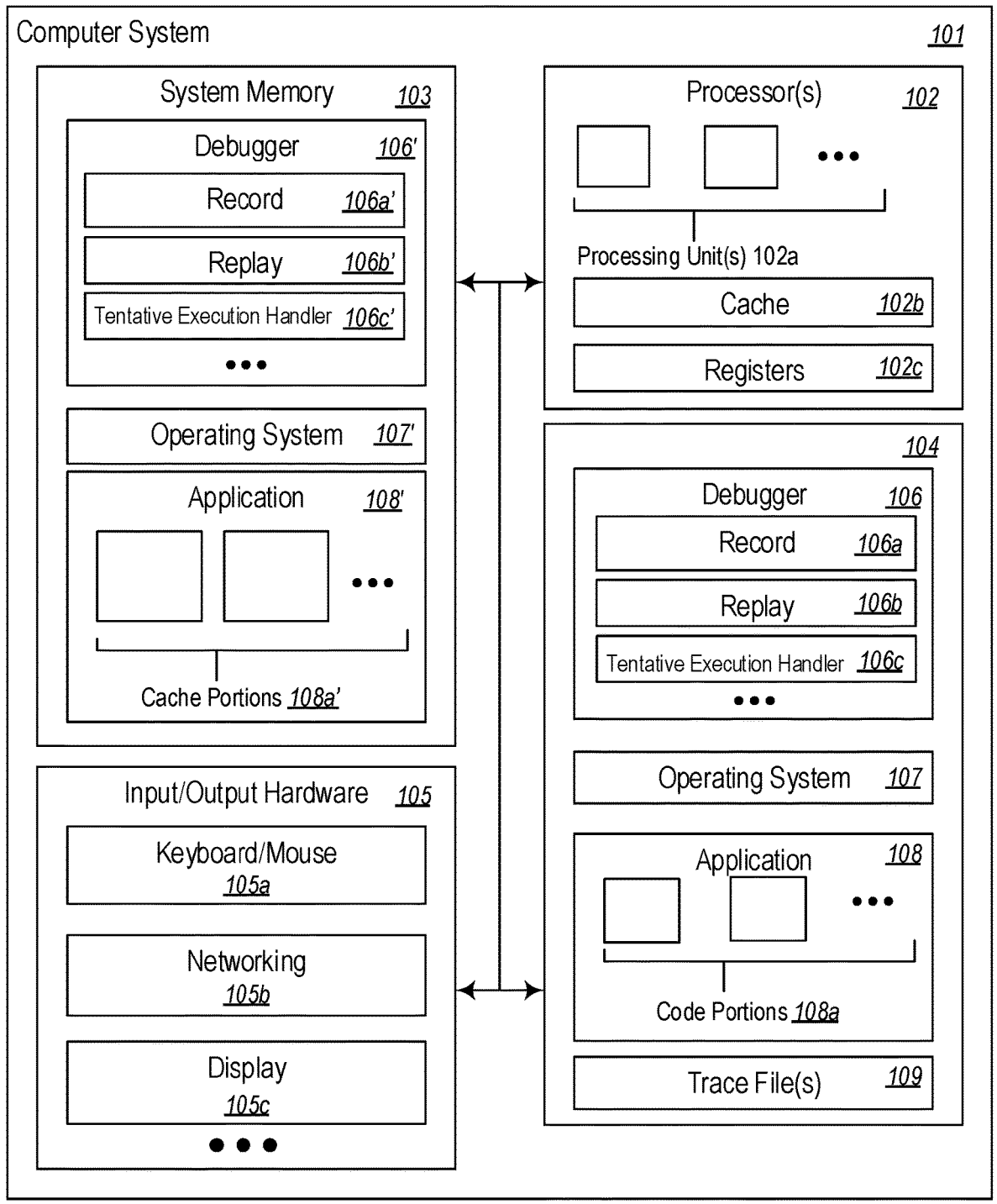
FIG. 1 illustrates an example computing environment that facilitates time-travel recording and replay.

FIG. 1 illustrates an example computing environment 100 that facilitates time-travel trace recording and replay, as well as tentatively executing code. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiments, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The data store 104, which typically comprises durable storage, can store computer-executable instructions and/or data structures representing application code such as, for example, a debugger 106 (including, for example, a record component 106a, a replay component 106b, a tentative execution handler 106c, etc.), an operating system 107, and an application 108 (including portions of executable code 108a of the application 108). The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime debugger data 106' (runtime record data 106a', runtime replay data 106b', runtime tentative execution handler data 106c', etc.), runtime operating system data 107', and runtime application data 108' (including, for example, runtime variables, data structures, etc. of application 108 as it executes, as well as runtime code portions 108a' which are in-memory copies of code portions 108a).

While the record component 106a and replay component 106b are depicted as being part of debugger 106, it will be appreciated that one more of these components could be a standalone application, or part of some other application. The record component 106a is usable to trace execution of an application, such as application 108 (including its executable code portions 108a), and to store trace data in the trace file(s) 109. The record component 106a may, in some embodiments, be integrated into the operating system 107, itself, into a hypervisor, or into some other runtime or virtualization technology. The record component 106a may also exist at an entirely different computer system to record traces at that computer system. Thus, the record component 106a may trace execution of code at the computer system; then the trace file(s) 109 resulting from that tracing can be transferred (e.g., using the networking hardware 105b) to the computer system 101 for replay by the replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes processing unit(s) 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more virtual processing units 102a presented by that single physical processing unit.

Each processing unit 102a executes processor instructions that are defined by applications (e.g., debugger 106, operating system 107, application code portions 108a, etc.), and which instructions are selected from among a predefined processor ISA (instruction set architecture). The particular ISA of a given processor 102 varies based on processor manufacturer and processor model. Common ISA's include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally visible (i.e., external to the processor) unit of code that is executable by a processor.

Each processing unit 102a obtains processor instructions from a processor cache 102b (which may potentially be shared by the processing units 102a), and executes the processor instructions based on data in the cache 102b, based on data in registers 102c, and/or without input data. In general, the cache 102b is a small amount (i.e., small relative to the typical amount of system memory 103) of random-access memory that stores on-processor copies of portions of the system memory 103. For example, when executing the executable code portions 108a of application 108, the cache 102b stores a subset of the runtime code portions 108b' in a code cache section of the cache 102b, and stores other runtime application data 108' (e.g., variables, data structures, etc.) in a data cache section of the cache 102b. If the processing unit(s) 102a require data not already stored in the cache 102b, then a "cache miss" occurs, and that data is fetched from the system memory 103 (potentially evicting some other data from the cache 102b).

Registers 102c are hardware based storage locations that are defined based on the ISA of the processors(s) 102 and that are read from and/or written to by processor instructions. For example, registers 102c are commonly used to store values fetched from the cache 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102c may comprise "flags" that are used to signal some state change caused by executing processor instructions.

The replay component 106b replays one or more trace file(s) 109 by executing the code of the executable entity upon which the trace file(s) 109 are based at the processor(s) 102, while supplying that code with traced data (e.g., register values, memory values, etc.) from the trace file(s) 109 at appropriate times. Thus, for example, the record component 106a may record execution of one or more code portions 108a of application 108 at the processor(s) 102, while storing trace data (e.g., memory values read by code instructions, register values supplied to code instructions, etc.) in the trace files(s) 109. Then, the replay component 106b can re-execute the code portion(s) 108a at the processor(s) 102, while supplying that code with the trace data from the trace files(s) 109 so that the code is executed in the same manner that it was at trace time.

Figure 2:
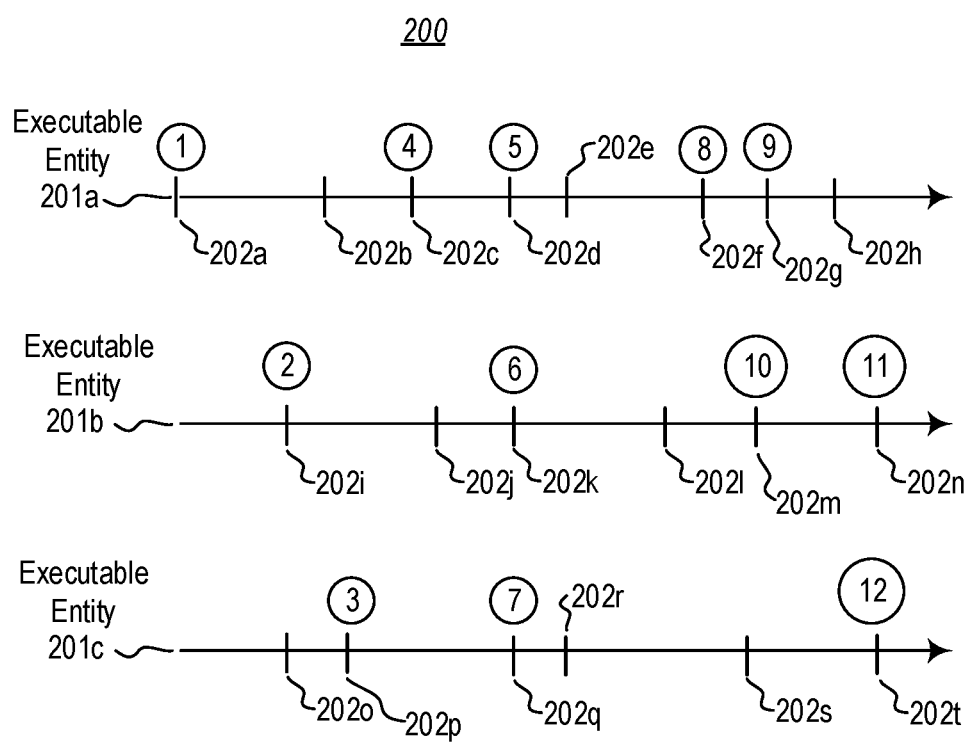
FIG. 2 illustrates an example timing diagram representing a portion of execution of three executable entities.

FIG. 2 illustrates an example timing diagram 200 representing a portion of execution of three executable entities 201a-201c (e.g., as observed during recording/tracing by the record component 106a), with execution commencing at the left end of the arrow, and proceeding to the right. For example, executable entities 201a-201c may correspond to threads of application 108 that execute code from one or more of code portions 108a. In another example, executable entities 201a-201c may correspond to threads of a kernel of the operating system 107. In FIG. 2, the executable entities 201a-201c execute in parallel (e.g., concurrently, each at a different physical or virtual processing unit 102a), though the embodiments herein can also operate in environments in which the executable entities 201a-201c execute "single threaded," sharing time at a single processing unit.

In FIG. 2, individual events occur along each arrow. In general, these events correspond to individual processor instructions executed from each executable entity. Since, on modern processors, these events can easily number in the billions for mere seconds of execution, they are not expressly depicted in FIG. 2. However, FIG. 2 does identify several events occurring across the entities (i.e., events 202a-202t) that may be of particular interest during debugging. For example, they may correspond to instructions associated with interesting memory accesses (e.g., those that would be the basis of an orderable event, and which are depicted in connection with a circled "sequencing number," as discussed later), instructions associated with certain logical boundaries (e.g., a call to or an exit from a function, a module, a kernel transition, etc.), instructions associated with exceptions, instructions associated with cache flushes, instructions associated with input/output operations (e.g., disk accesses, network accesses, etc.), instructions associated with activity of a runtime environment (e.g., a garbage collection activity), etc. Events may also be associated with data obtained from replay of the entit(ies), such as an amount of elapsed time (e.g., "wall clock" time), an amount of processing time (e.g., processor cycles used), reaching a particular instruction count, etc. While events 202a-202t are depicted as having occurred, it is noted that the record component 106a may not actually recognize each of them as being interesting events.

Figure 3:
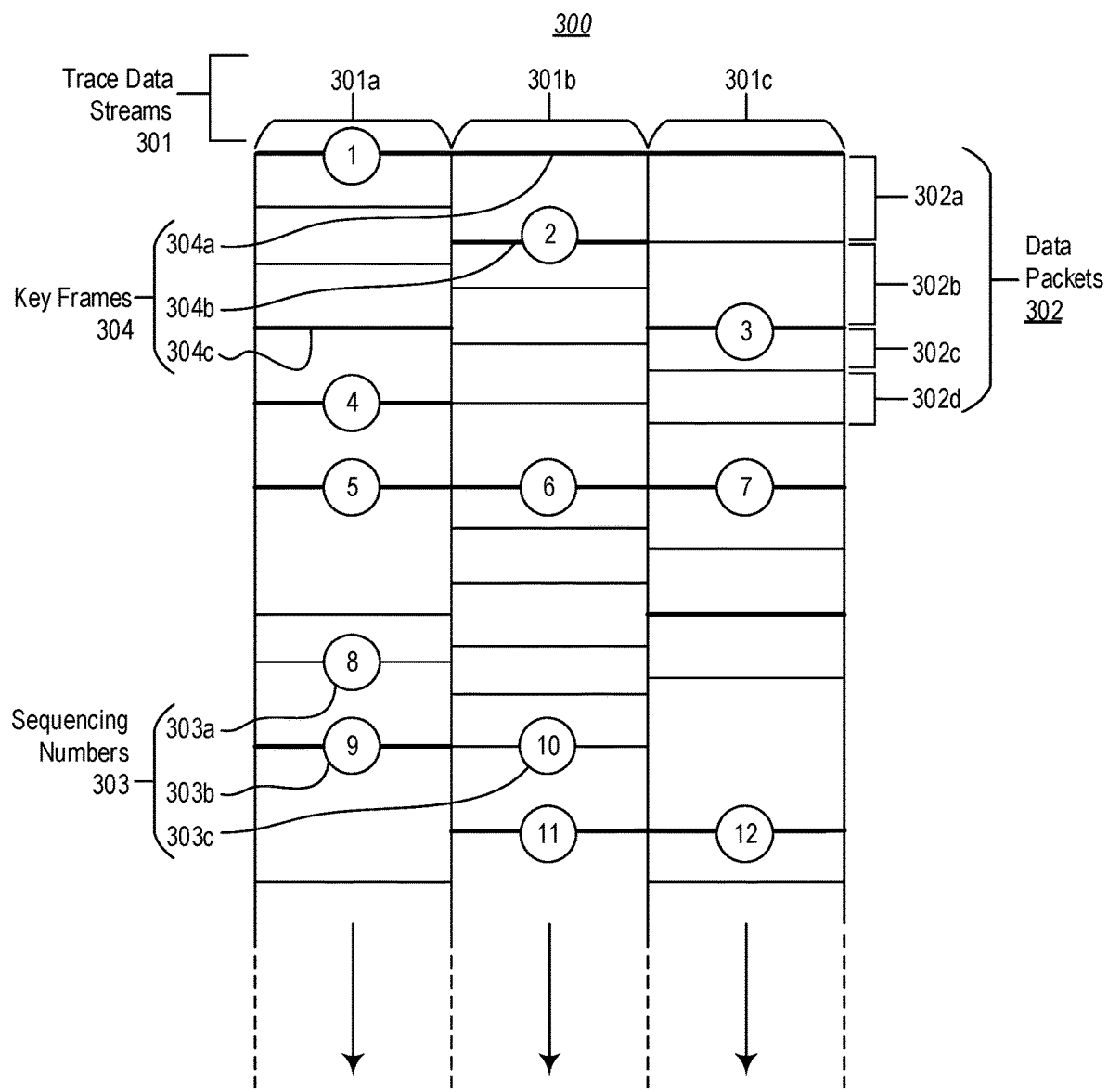
FIG. 3 illustrates an example of a trace file recorded based on the timing diagram of FIG. 2.

In view of FIG. 2, FIG. 3 illustrates one example of a trace file 300 that might be generated by the record component 106a based on the execution of the executable entities 201a-201c depicted in FIG. 2. In FIG. 3, which is based on a parallel execution of executable entities 201a-201c, the trace file 300 independently stores a different data stream recording data representing a different instance of execution of a code entity. Thus, in FIG. 3, the trace file 300 includes three trace data streams 301a-301c (referred to generally as trace data streams 301), each recording a trace of execution of one of executable entities 201a-201c. It will be appreciated that the trace file 300 could include any number of trace data streams 301, depending on a number of processing units 102a available at the computer system 101 and/or a number of executable entities produced by the program being traced (e.g., application 108). It will also be appreciated that the trace data streams 301 may be included in a single file trace file, or may each be stored in different related files.

Each trace data stream 301 includes a plurality of data packets storing trace data that is usable by the replay component 106b to reproduce execution of its corresponding executable entity, by supplying appropriate recorded state data (e.g., register values, memory addresses and values, etc.) to executable code of the executable entity at appropriate times. Thus, using the information in the data streams 301, and using the actual executable code of the application whose execution was traced, a full reproduction of execution of that code can be reproduced by the replay component 106b.

In some embodiments, each data packet could potentially represent the execution of a plurality of code instructions. For example, a data packet may record information that identifies a code instruction to be executed, and its inputs. Then, the replay component 106b may replay a series of instructions, where each instruction in the series is dependent only on the outputs of the prior instruction(s) to it in the series, and/or other program state (e.g., register values, memory values, etc. that were established as part of replaying prior data packet(s) in the same trace data stream 301).

One manner for recording state data in data packets of each trace data stream 301 is built upon the recognition by the inventors that processor instructions (including virtual machine "virtual processor" instructions) can generally fall into one of three categories: (1) instructions identified as "non-deterministic" as not producing predictable outputs because their outputs are not fully determined by data in general registers 102c or memory, (2) deterministic instructions whose inputs do not depend on memory values (e.g., they depend only on processor register values, or values defined in the code itself), and (3) deterministic instructions whose inputs depend on reading values from memory. Thus, in some embodiments, storing enough state data to reproduce the execution of instructions can be accomplished with solutions to three corresponding challenges: (1) how to record the non-deterministic instructions that produce outputs not fully determined by their inputs, (2) how to reproduce the values of input registers for instructions depending on registers, and (3) how to reproduce the values of input memory for instructions depending on memory reads.

As a solution to the first challenge, of how to record "non-deterministic" instructions of an entity that do not produce fully predictable outputs because their outputs are not fully determined by data in general registers or memory, embodiments including storing in the trace data stream 301 of an entity the side-effects of execution of such instructions. As used herein, "non-deterministic" instructions include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked by the record component 106a (e.g. debug registers, timers, etc.), and/or that (iii) produce processor-specific information (e.g., CPUID on INTEL processors, which write processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects in the trace file 300.

As a solution to the second challenge, of reproducing the values of input registers for deterministic instructions of an entity (e.g., whose inputs depend only on processor register values) is straightforward, as they are the outputs of the execution of the previous instruction(s) by the entity. Recording the execution of an entire series of processor instructions in a trace data stream 301 can therefore be reduced to reproducing the register values at the beginning of the series; the trace file 300 need not store a record of which particular instructions executed in the series, or the intermediary register values. This is because the actual instructions are available in the application's code portions 108a themselves, and which are available at replay time. These instructions can therefore be supplied the recorded inputs (i.e., the recorded initial set of register values) during reply, to execute in the same manner as they did during the trace.

As a solution to the third challenge, of reproducing the values of input memory for deterministic instructions of an entity whose inputs depend on memory values, embodiments include recording in the trace data stream 301 of the entity the memory values that the instructions in the entity consumes (i.e., its reads)—irrespective of how the values that the instructions read were written to memory. In other words, some embodiments include recording only memory reads, but not memory writes. For example, although values may be written to memory by a current thread, by another thread (including the kernel, e.g., as part of processing an interrupt), or by a hardware device (e.g., input/output hardware 105), it is just the values that the thread's instructions read that are needed for full replay of instructions of the thread that perform reads. This is because it is that values that were read by the thread (and not necessarily all the values that were written to memory) that dictated how the thread executed.

While in some embodiments, the value of each memory value read may be stored in the trace file 300, other embodiments include optimizations such as prediction techniques that attempt to predict the appropriate values without necessarily recording each read. For example, in some implementations, if the predicted value is the value that was actually read from memory, then nothing needs to be recorded in the trace file 300; however, if the predicted value does not match the value that was actually read then the value read is recorded in the trace file 300. While several prediction techniques exist, two simple prediction techniques include predicting that the next memory value read by a thread will be the same as the value previously read by the thread, or to always predict that the next memory read will have a value of zero.

FIG. 3 depicts data packets as being bounded by the horizontal lines in each data stream. Four data example packets 302 in data stream 301c are expressly labeled as data packets 302a-302d. As depicted, individual data packets may be of differing sizes, depending on trace file implementation and on the particular data stored in each packet. It will be appreciated in view of the discussion above, that data that may be included in a data packet includes information for identifying a code instruction executed (e.g., a count of instructions executed since the last logged code instruction, a processor instruction counter value, etc.), register value(s) provided to that code instruction, memory address(es)/value(s) read, any side effects of executing the code instruction (e.g., resulting register values), etc. Note that while the events in FIG. 2 are shown for clarity in relation to "wall clock" time, the data packets do not necessarily indicate the relative "wall clock" time at which different events happened.

The trace file 300 includes standard data packets (which are a depicted as beginning with a light horizontal line), as well as key frames 304 (which are a depicted as beginning with heavy horizontal lines). A key frame is a type of data packet that stores sufficient information to begin replay execution of an executable entity from the point of the key frame onward, without the need of having execution/replay state from packets prior to the key frame. For example, a key frame may store values for all relevant processor registers, information necessary to reproduce memory values from that point onward, etc.

The trace file 300 includes a key frame at the beginning of each trace data stream 301 (which enables the replay component 106b to begin replay of each trace data stream), as well as additional key frames appearing throughout each trace data steam 301. Three example key frames are expressly labeled in FIG. 3 as key frame 304a (which occurs at the beginning of trace data stream 301b), key frame 304b (which occurs in connection with an orderable event, which are discussed later), and key frame 304c. In general, the record component 106a can record a key frame at any point in a data stream 301. As depicted, they need not occur at the same time across data streams, or at any particular frequency.

As mentioned above, key frames enable the replay component 106b to initiate replay of each trace data stream 301 at various points. For example, referring to data stream 301a, the replay component 106b can use key frames to initiate execution at different parts in the stream, including at the start of the data stream, at "sequencing numbers" 4, 5, and 9 (which, as depicted, each corresponds with a key frame), and at key fame 304c. Thus, key frames define different independently repayable trace sections (or segments), with each section being bounded on both ends by a key frame.

In some embodiments, when using the example format of trace file 300, the record component 106a records each data stream 301 generally independently from the other data streams during parallel execution of the code being traced. In doing so, record component 106a does not generally record the actual timing execution of events by one entity versus the timing of execution of events by another entity, since code instructions executed by one entity generally don't affect code instructions executed by another entity. Thus, the data packets in one trace data stream 301 can generally be replayed independent of the data packets in another trace data stream 301.

The trace file 300 does, however, include some data packets identifying events that are "orderable" across the entities/data streams. These orderable events generally correspond to events that are performed by one executable entity that could affect execution of another entity, such as accessing memory shared by the entities. In FIGS. 2 and 3, orderable events are represented with a "sequencing number" that defines the relative order in which these events occurred across the entities relative to each other. Since only "orderable events" are given sequencing numbers, they provide only a partial ordering of all events recorded in the trace, as discussed later. In some embodiments, the sequencing number is a monotonically incrementing number ("MIN")—i.e., a number that increments monotonically and that that is guaranteed to not repeat. For example, the trace file 300 includes twelve sequencing numbers (depicted as circled numerals 1-12), each defining the order in which different orderable events executed across entities 201a-201c relative to each other.

In some embodiments, orderable events are identified based on a "trace memory model" that defines whether to treat events as orderable or non-orderable based on their interactions across executable entities. For example, orderable and/or non-orderable events may be defined based on how the threads interact through shared memory, their shared use of data in the shared memory, etc. Depending on implementation, a trace memory model used by the record component 106a may be weaker or stronger than a memory model used by the processor 102. The trace memory model used may be a memory model defined by a programming language used to compile code (e.g., C++14), or some other memory model defined expressly for purposes of tracing.

A first example trace memory model may treat as orderable only kernel calls (from user mode), traps, and exceptions. This trace memory model would have low overhead, since these operations are relatively "expensive" in their own right, they are likely tracked anyway and provide a very coarse-grained overview of ordering. A second example trace memory model may treat as orderable full fences (i.e., operations that have both acquire & release semantics). Examples of such operations may include INTEL's "locked" instructions, kernel calls, exceptions, and traps. This memory model would provide enough ordering for nearly all cross-thread communication that happens in the process when the code uses "interlocked" types of primitives to communicate cross threads, which is common in operating systems such as WINDOWS from MICROSOFT CORPORATION). A third example trace memory model may treat all acquires and releases as orderable. This memory model may be suitable for processors based on ARM instruction sets, because ARM does not treat most loads and stores as acquires or releases. On other architectures, such as from INTEL (in which a majority of memory accesses are acquires or releases), this would equate to ordering almost all memory accesses. A fourth example trace memory model may treat as orderable all memory loads. This would provide for strong ordering but may lead to decreased performance as compared to the other example memory models. The foregoing memory models have been presented as examples only, and one of ordinary skill in the art will recognize, in view of the disclosure herein, a vast variety of memory models may be chosen.

In view of the foregoing discussion of trace file 300, it will be appreciated that key frames enable the replay component 106b to initiate replay of different sections of the same trace data stream, and thus enable the replay component 106b to replay these different sections of the same trace data stream 301 independently and in parallel. Additionally, with the trace data streams 301 being recorded independently, and with the timing of events in one trace data stream being generally independent from the timing of events in another trace data stream, the replay component 106b can replay sections from different trace data streams 301 independently and in parallel.

Sequencing numbers then enable the replay component 106b to combine the results of parallel replay of these individual sections to present an accurate representation of how the entities actually executed when they were recorded. In particular, the sequencing numbers (which, as discussed above, define the relative order of orderable events across the trace data streams, and a partial ordering of all events) enable the replay component 106b to choose an ordering among the different trace sections to define a total ordering of all instructions in the trace file 300 that can be used to present results at the debugger 106. Such an ordering enables the debugger 106 to present a consistent view of program state (e.g., memory and registers) at all points in the trace, and no matter how the replay component 106b actually arrived at that point in execution (e.g., what order in which it executed individual trace sections).

Since sequencing numbers only provide a partial ordering of events, there could be many valid orderings. In general, a valid ordering places the trace sections in an order that would ensure that sequencing events are presented in proper order (i.e., in their monotonically increasing order). However, a valid ordering does not need to reproduce the exact order in which all instructions executed relative to each other at trace time. For example, in reference to FIG. 2, a valid ordering needs to ensure that an orderable event at sequencing number 3 is presented as having occurred prior to an orderable event at sequencing number 4. However, the ordering does not need to ensure that a non-orderable event executed just after sequencing number 3 by entity 201c is presented prior to a non-orderable event executed just after sequencing number 4 by entity 201a, since these events are non-orderable events at different entities.

Valid orderings need not include sections from all trace data streams (e.g., because execution of one thread may not be relevant to obtaining desired data at a given point of interest), and multiple valid orderings could be chosen. For example, suppose that reverse breakpoint on the event at sequencing number 8 is being requested. One valid ordering of sections to reach this breakpoint using only trace data streams 301a and 301c could include:

1. A section on trace 301a starting at the key frame at sequencing number 1, and ending at an instruction just prior to the key frame at sequencing number 4, then
2. A section on trace 301c starting its beginning key frame, and ending at an instruction at the key frame at sequencing number 3, then
3. A section on trace 301a starting at the key frame at sequencing number 4, and ending at an instruction just prior to the key frame at sequencing number 5, then
4. A section on trace 301c starting at an instruction just after the key frame at sequencing number 3, and ending at an instruction just prior to the key frame at sequencing number 7, and then
5. A section on trace 301a starting at the key frame at sequencing number 5, and ending at an instruction just prior to the key frame at sequencing number 9. Note that this section includes sequencing number 8 between sequencing numbers 5 and 9.

If these sections are viewed as having been replayed linearly, in the order specified, then all the instructions on trace 301a up to (but not including) sequencing number 9 are replayed, all of the instructions on trace 301c up to (but not including) sequencing number 7 are replayed, and each orderable event that was replayed is viewed as being replayed in the correct order (i.e., 1, 3, 4, 5, and 8).

Another valid ordering using all the trace data streams that could be chosen to arrive at sequencing event 8 could include:

1. A section on trace 301*a* starting at the key frame at sequencing number 1, and ending at an instruction just prior to the key frame at sequencing number 4, then
2. A section on trace 301*b* starting its beginning key frame, and ending at an instruction just prior to the key frame at sequencing number 2, then
3. A section on trace 301*c* starting its beginning key frame, and ending at an instruction just prior to the key frame at sequencing number 3, then
4. A section on trace 301*b* starting at the key frame at sequencing number 2, and ending at an instruction just prior to the key frame at sequencing number 6, then
5. A section on trace 301*c* starting at an instruction at the key frame at sequencing number 3, and ending at an instruction just prior to the key frame at sequencing number 7, then
6. A section on trace 301*a* starting at the key frame at sequencing number 4, and ending at an instruction just prior to the key frame at sequencing number 5, then
7. A section on trace 301*a* starting at the key frame at sequencing number 5, and ending at an instruction just prior to the key frame at sequencing number 9. Note again that this section includes sequencing number 8 between sequencing numbers 5 and 9.

Similarly, if these sections are viewed has having been replayed linearly, in the order specified, all the instructions on trace 301*a* up to (but not including) sequencing number 9 are replayed, all of the instructions on trace 301*b* up to (but not including) sequencing number 6 are replayed, and all of the instructions on trace 301*c* up to (but not including) sequencing number 7 are replayed, and each orderable event that was replayed is viewed as being replayed in the correct order (i.e., 1, 2, 3, 4, 5, and 8).

The replay component 106*b* need not actually perform the replay of the sections according to this determined ordering. Instead, replay component 106*b* can replay the sections in any order, so long as the results obtained by the replay are presented according to the constraints of the determined ordering. Thus, the replay component 106*b* can queue the trace sections for replay in any order, and can replay them in any order at one or more processing units 102*a*, so long as the results are presented in a valid ordering.

As shown in FIG. 1, the debugger 106 may include a tentative execution handler 106*c*. In general, the tentative execution handler 106*c* enables the debugger 106 to suspend execution of an entity (e.g., a live execution of code portion(s) 108*a*, a replay of code portion(s) 108*a* based on trace file(s) 109, etc.), to substitute user-supplied value(s) for one or more runtime data element(s) (e.g., variables, registers, etc.), and to tentatively resume execution of the entity from the suspension point using the substituted value(s). During this tentative execution, the tentative execution handler 106*c* isolates environmental changes (e.g., changes to memory values, file data, etc.) that could adversely affect the debugger's ability to later resume from the suspension point with the original value(s) without consequence. In doing so, the tentative execution handler 106*c* enables a user to use the debugger 106 to engage in "what if" hypotheticals to see how the execution might deviate based on changing portions of program state, while enabling the original execution to proceed unaffected by the hypotheticals.

In the description that follows, tentative execution is described primarily in the context of replay of a traced entity—i.e., in which replay of an entity is suspended by a debugger, so that a tentative replay of the entity can be conducted. It will be appreciated, however, that the principles described herein apply to other scenarios beyond time-travel debugging, such as performing a tentative replay of an entity that is initially executing live (i.e., a live debugging session instead of a time-travel debugging session), performing a tentative replay of an entity whose state is derived from a process dump, etc.

Figure 4:
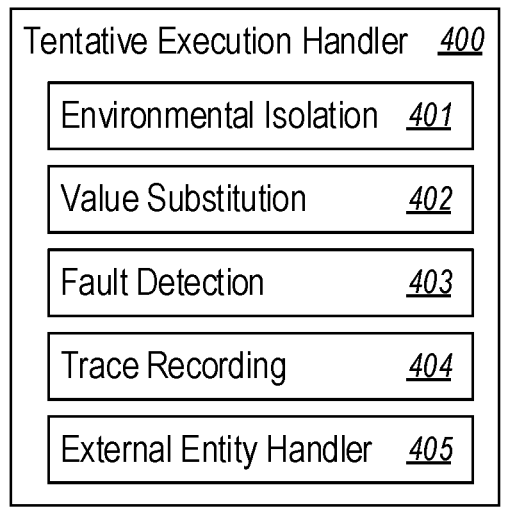
FIG. 4 illustrates an example of a tentative execution handler.
Figure 5:
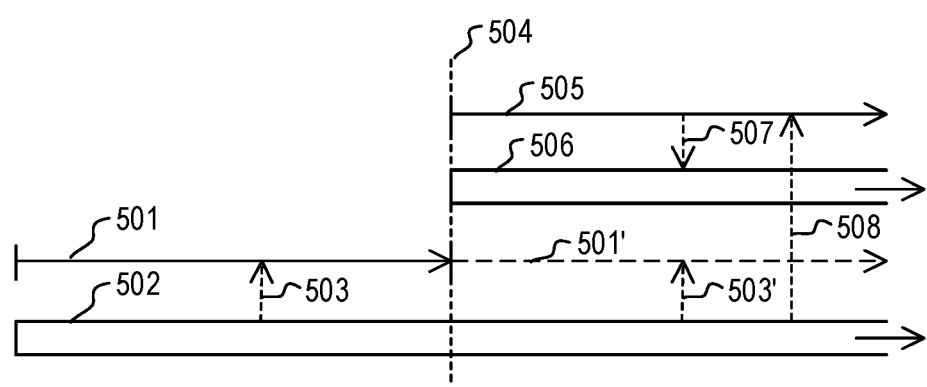
FIG. 5 illustrates an example timeline of tentative replay of an entity based on a trace file.

To facilitate a further understanding of tentative replay, FIG. 4 illustrates additional detail of an example of a tentative execution handler 400, such as tentative execution handler 106*c* of FIG. 1. In addition, FIG. 5 illustrates an example timeline 500 of tentative replay of an entity based on a trace file. As depicted in FIG. 4, the tentative execution handler 400 includes a plurality of sub-components, such as an environmental isolation component 401, a value substitution component 402, a fault detection component 403, a trace recording component 404, and/or an external entity handler 405. The depicted identity and arrangement of sub-components 401-405 are merely one example as an aide in description, and one of ordinary skill in the art will recognize that the particular identity and number of sub-components of the tentative execution handler 400 can vary greatly based on implementation.

In general, the tentative execution handler 400 operates in connection with replay by the replay component 106*b* of a code entity (e.g., a code portion 108*a*) based trace data of a trace file 109. Thus, for example, FIG. 5 depicts a replay timeline 501 showing replay of a code entity (e.g., a code portion 108*a*) based on a trace data stream 502 (e.g., trace file 109). In reference to FIGS. 2 and 3, timeline 501 could represent a replay of one of executable entities 201 (e.g., executable entity 201*a*), and trace data stream 502 could correspond to a corresponding trace data stream 301 (e.g., trace data stream 301*a*). In FIG. 5, the arrow 503 extending from trace data stream 502 to replay timeline 501 indicates that trace data from the trace data stream 502 is being used to control replay of the entity. For example, the trace data stream 502 may be used to provide inputs to processor instructions of the code entity, to supply values for memory reads, etc. It will be appreciated that the principles described herein can apply to a variety of trace file formats.

During replay, the replay component 106*b* may suspend code execution. This may be due to manual intervention by a user or a software component, due to hitting a defined breakpoint or watchpoint, and the like. Thus, for example, in FIG. 5 the replay timeline 501 is suspended at a particular point in time 504. At this time, the debugger 106 may present one or more portions of program state (e.g., the values of variables, registers 102*c*, etc.) as they exist at the time the code replay is suspended. From here, the replay could be resumed, as depicted by continued replay timeline 501', which continues to rely on trace data stream 502 as indicated by arrow 503'.

When the debugger 106 includes the tentative execution handler 400, however, the debugger 106 may present one or more interfaces that enable alternative value(s) to be supplied for one or more portions of the program state. For example, a user interface may enable a user to provide alternate value(s) for code variables, processor registers 102*c*, etc., and/or a software interface may enable a software component to provide alternate value(s) for code variables, processor registers 102*c*, etc.

Thus, rather than continuing replay as normal (i.e., continued replay timeline 501'), the tentative execution handler 400 could utilize the replay component 106*b* to perform a tentative replay based on alternative value(s) received during the replay suspension. Thus, for example, FIG. 4 depicts that the tentative execution handler 400 includes an environmental isolation component 401 and a value substitution component 402. Using the environmental isolation component 401, the tentative execution handler 400 resumes replay by the replay component 106b of the code entity, but does so within an isolated environment that prevents any environmental changes made by the code entity during this resumed replay from affecting the original replay timeline 501. Prior to resuming replay, the value substitution component 402 modifies the program state at the time of suspension with the substituted value(s)—such as substituting the values of variables, processor registers 102c, etc.

This tentative replay is depicted in FIG. 5 using tentative replay timeline 505. Tentative replay timeline 505 is a continuation from replay timeline 501, and it utilizes trace data from the trace data stream 502 as indicated by arrow 508. However, is it depicted as being a separate timeline from replay timeline 501. This is because the environmental isolation component 401 ensures that environmental changes made during the tentative replay timeline 505 do not affect subsequent continued normal replay of replay timeline 501 (i.e., continued replay timeline 501').

For example, when the entity being replayed makes a write to a particular address of memory during the tentative replay timeline 505, the environmental isolation component 401 may emulate that write, rather than performing the write to the requested address. This could be done, for instance, by the environmental isolation component 401 redirecting the write to some other memory address that has not already been utilized by the entity in connection with replay timeline 501, and then redirecting subsequent reads from the requested address during the tentative replay timeline 505 to that other memory address. By way of another example, the environmental isolation component 401 could actually preform a write to the requested address during the tentative replay timeline 505, but save a copy of any data overwritten as part of the write, so the data can be restored later when resuming normal replay along replay timeline 501. Thus, during tentative replay timeline 505, the executable entity is presented that same memory space as with replay timeline 501, but any changes to this memory are tracked or isolated so replay timeline 501 can continue without consequence of any memory operations by tentative replay timeline 505.

As depicted, the tentative execution handler 400 may include additional components (e.g., fault detection component 403, trace recording component 404, external entity handler 405) that could be utilized during the tentative replay. The fault detection component 403 identifies conditions in which the tentative replay timeline 505 can continue no further. For example, as mentioned, execution of the entity during the tentative replay timeline 505 still utilizes trace data from the trace data stream 502 (as indicated by arrow 508). If the substituted value(s) used to initiate the tentative replay timeline 505 causes execution of the entity to deviate from how it would execute during the continued replay timeline 501', then the entity might request data that is not available in the trace data stream 502. For example, it could request a read from a memory location not logged in the trace data stream 502, it could execute an instruction whose inputs are not logged in the trace data stream 502, etc. Thus, in these circumstances, the fault detection component 403 could cease the tentative replay, and notify the user or some other software component. Alternatively, the fault detection component 403 could prompt a user to supply a value for the missing data, or request a value for the missing data from some other software component. One example software component could be a "fuzzing" tool that automates software testing by providing invalid, unexpected, or random data as an input.

The trace recording component 404 can cause execution of the entity during the tentative replay timeline 505 to be logged to a separate trace data stream 506, as indicated by the arrow 507 (e.g., using record component 106a). This enables the debugger 106 to perform additional replay/analysis on how the entity executed during the tentative replay. Additionally, the data in the separate trace data stream 506 can be the basis of a comparison to data in the original trace data stream 502, in order or to identify differences between execution during the tentative replay timeline 505 versus the continued replay timeline 501'.

The external entity handler 405 deals with situations in which the entity that is being replayed during tentative replay timeline 505 attempts to interact with some external entity, such as a file. It is noted that since the replay is occurring at a different time than when the trace data stream 502 was recorded, and potentially at an entirely different computer system, external entities may not be available or may be in a different state than they existed during recording. Thus, if the executable entity attempts to access data from external entities during the tentative replay timeline 505 that was not accessed during recording, that data may be unavailable. Furthermore, if the executable entity attempts to write to these external entities during the tentative replay timeline 505, this could alter environmental state needed to be able to resume normal replay (i.e., continued replay timeline 501') without any consequence of having performed the tentative replay.

In the case of file access, some considerations for the external entity handler 405 to handle are what do to in the case of reads that have not been recorded in the trace data stream 502, and what to do in the case of writes. This may include emulating reads and/or writes so that they appear to the entity to be performed, but do not actually affect the file. In the case of a read, the external entity handler 405 could prompt a user to provide a file from which to perform the read, prompt a user for data to supply as the data read, or notify the fault detection component 403 of a fault that prevents the tentative replay from proceeding. In the case of writes, the external entity handler 405 could perform an emulation, similar to that performed as part of a memory write. For example, it could honor the write, but store the data in some location other than the actual external entity. Of course, the external entity handler 405 could refuse to honor a write, and notify the fault detection component 403.

Other types of external entities could include network connections/sockets, inter-process communications sockets, etc. In these cases, the fault detection component 403 could emulate writes to the entities. In the case of reads, the fault detection component 403 could prompt a user for input, or notify the fault detection component 403 of an inability to proceed.

At any point during the tentative replay, the debugger 106 enables a user to view and interact with program state to observe how the entity would have executed given the alternative value(s). Using the separate trace data stream 506 created during the tentative replay, the debugger 106 can even perform time-travel analysis of this tentative replay, including setting reverse breakpoints/watchpoints, etc.

Upon conclusion of tentative replay (e.g., because of user intervention or because of some fault), the replay component 106b can resume the original replay timeline 501 at time 504, as indicated by continued replay timeline 501'. Due to the operation of the environmental isolation component 401 and the external entity handler 405, any environmental changes that have been made to memory not originally used during the original replay timeline 501 (and thus would not affect continued replay timeline 501') can be rolled back. As such, the continued replay timeline 501' can proceed as if the tentative replay had not occurred.

Due to the nature of the trace files described herein (e.g., in connection with FIGS. 2 and 3) which enable highly parallel and distributed replay, if they are used the various replay timelines 501, 501', and 505 need not occur at the same computing systems. Furthermore, even different segments of the same replay timeline can be processed at different computer systems. However, if other trace file formats are used, such parallelized/distributed replay may not be practical.

Figure 6:
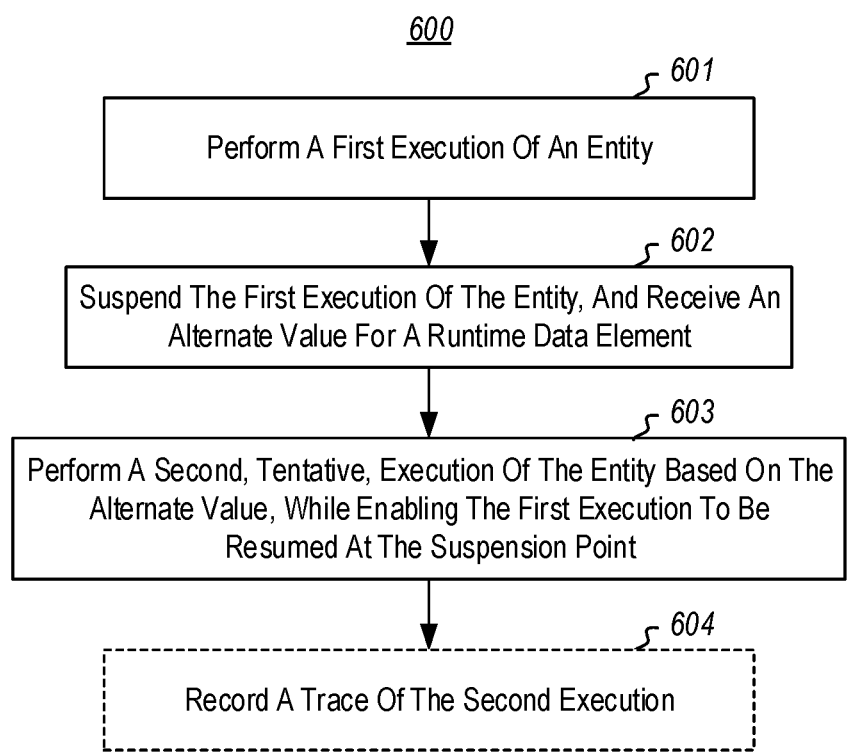
FIG. 6 illustrates a flowchart of an example method for tentatively executing an entity.

FIG. 6 illustrates an example of a method 600 for tentatively executing an entity. Method 600 is described primarily in connection with FIGS. 1-5. While method 600 is presented as a series of acts, it will be appreciated that the particular number and ordering of the acts shown is only an example of tentative replay consistent to the embodiments herein.

As depicted, method 600 includes an act 601 of performing a first execution of an entity. For example, the debugger 106 can execute an entity, such as application 108. In some embodiments that replay the entity from a trace file, act 601 includes the first execution comprising a replayed execution of the entity based on utilizing one or more first trace data streams to supply inputs to the entity, the one or more first trace data streams recorded during a prior execution of the entity. For example, the replay component 106b can replay execution of an entity based on trace data stream. As depicted in FIG. 5, for example, the replay component 106b can replay an executable entity based on a trace data stream 502 to create a replay timeline 501. Trace data stream 502 could, for example, record a prior execution of an executable entity (e.g., 201a), and could therefore correspond to trace data stream 301a of FIG. 3.

Method 600 also includes an act 602 of suspending the first execution of the entity, and receiving an alternate value for a runtime data element. In some embodiments, act 602 comprises, at a point in the first execution of the entity, suspending the first execution of the entity; identifying a runtime data element used by the entity, the runtime data element having a first value based on the replayed execution; and receiving input specifying a second, different, value for the runtime data element. For example, the debugger 106 can suspend execution of the entity and receive an alternate value for a runtime data element. Returning to the replay example, at a point in time 504, the replay of the replay timeline 501 could be suspended (therefore suspending replay timeline 501) by the replay component 106b. The suspension could be a result of hitting a breakpoint or watchpoint, a user manually suspending replay, etc. At this time, the debugger 106 can present portions of runtime program state, such as the values of various variables, registers, etc. Then, the debugger 106 can receive alternate value(s) for one or more of these portions of runtime state.

Method 600 also includes an act 603 of performing a second, tentative, execution of the entity based on the alternate value, while enabling the first execution to be resumed at the suspension point. For example, the debugger 106 can perform a tentative execution of the entity, while isolating its environmental changes from the original execution. In some embodiments, act 603 comprises, based on the input, performing a second execution of the entity starting at the point in the first execution, while enabling the first execution to be later resumed unaffected by the second execution, including setting the runtime data element to the second value, and emulating one or more memory writes performed by the entity during the second execution. In embodiments that utilize replay, act 603 can also comprise utilizing the one or more first trace data streams to supply inputs to the entity. For example, the tentative execution handler 400 can resume execution of the executable entity (for example, the replay component 106b could resume replay of the executable entity using the trace data stream 502, shown as tentative replay timeline 505). However, prior to initiating this execution the value substitution component 402 of the tentative execution handler 400 can substitute the value(s) received in act 602 for one or more portions of the runtime state. Additionally, the environmental isolation component 401 of the tentative execution handler 400 can isolate any environmental changes made during the tentative execution timeline 505 from the replay timeline 501. Thus, notwithstanding the execution of tentative replay timeline 505, the replay timeline 501 can be continued later (i.e., as continued replay timeline 501) without any consequence.

In some embodiments, the environmental isolation component 401 presents the second execution of the entity with the same memory space used by the entity during the first execution, but emulates memory reads/writes performed by the entity during the second execution to keep them isolated. For example, this could include redirecting target memory address for reads/writes to memory addresses not used by the first execution of the entity, and/or saving an existing value at a destination memory address, and restoring the existing value when resuming the first execution of the entity.

Method 600 may also include an act 604 of recording a trace of the second execution. In some embodiments, act 604 comprises recording the second execution of the entity into one or more second trace data streams. For example, while the relay component 106b replays the executable entity as part of replay timeline 501, the trace recording component 404 of the tentative execution handler 400 can cause the record component 106a to record that execution to trace data stream 506. The trace data stream 506 can then be the basis of later time-travel debugging, and/or comparison to trace data stream 502.

Accordingly, embodiments herein provide debugger capabilities for tentatively executing traced code, which enables debuggers to provide answers "what if" questions when replaying execution of an executable entity based on data contained in a trace file.

Although the subject matter has been described in language specific to structural features and/or methodological acts, it is to be understood that the subject matter defined in the appended claims is not necessarily limited to the features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
   one or more processors; and
   one or more computer-readable media having stored thereon computer-executable instructions that are executable by the one or more processors to configure the computer system to tentatively execute an entity, the computer-executable instructions including instructions that are executable to configure the computer system to perform at least the following:
replay a prior execution of an entity based on a trace of the prior execution of the entity;
at a particular point in the replay of the prior execution of the entity:
suspend the replay of the prior execution of the entity;
identify a runtime data element used by the entity at the particular point, the runtime data element having a first value based on the replayed execution; and
receive input specifying a second, different, value for the runtime data element; and
perform a tentative replay of the entity starting at the particular point using the trace and using the second value for the runtime data element, while enabling the replay of the prior execution of the entity to be later resumed at the particular point unaffected by the tentative replay, including:
setting the runtime data element to the second value;
emulating one or more memory writes performed by the entity during the tentative replay; and
detecting that the tentative replay has deviated from the prior execution and can long continue using the trace for the tentative replay, based on determining that the entity has requested data from the trace during the tentative replay that is not available in the trace.

2. The computer system of claim 1, wherein replaying the prior execution of the entity comprises repaying the prior execution of the entity based on utilizing one or more first trace data streams to supply inputs to the entity, the one or more first trace data streams recorded during the prior execution of the entity.

3. The computer system of claim 2, wherein performing the tentative replay of the entity also includes recording the tentative replay of the entity into one or more second trace data streams.

4. The computer system of claim 2, wherein performing the tentative replay of the entity also comprises utilizing the one or more first trace data streams to supply inputs to the entity.

5. The computer system of claim 1, wherein performing the tentative replay of the entity comprises presenting, to the entity during the tentative replay, a memory space used by the entity during the replay of the prior execution of the entity.

6. The computer system of claim 5, wherein emulating one or more memory writes performed by the entity during the tentative replay comprises one or more of:
redirecting a target memory address to a memory addresses not used by the replay of the prior execution of the entity; or
saving an existing value at a destination memory address, and restoring the existing value when resuming the replay of the prior execution of the entity.

7. The computer system of claim 1, wherein the computer system ceases the tentative replay of the entity based on detecting that the tentative replay has deviated from the prior execution.

8. The computer system of claim 1, wherein the computer system prompts a user for an input of the requested data.

9. The computer system of claim 1, wherein performing the tentative replay of the entity also includes:
emulating one or more file operations performed by the entity during the tentative replay.

10. The computer system of claim 9, wherein emulating the one or more file operations comprises at least one of:
redirecting a write operation to a location separate from a destination file; or
performing a read operation from the location separate from the destination file.

11. The computer system of claim 1, wherein performing the tentative replay of the entity also includes:
emulating one or more memory reads performed by the entity during the tentative replay, including redirecting a target memory address to a memory addresses not used by the replay of the prior execution of the entity.

12. The computer system of claim 1, wherein performing the replay of the prior execution of the entity comprises performing one of:
a replayed execution of the entity based on one or more trace data streams; or
a replayed execution of the entity based on a process dump.

13. A method, implemented at a computer system that includes one or more processors, for tentatively executing a traced entity, the method comprising:
replaying a prior execution of an entity, the replay of the prior execution being based on utilizing one or more first trace data streams to supply inputs to the entity, the one or more first trace data streams recorded during the prior execution of the entity;
at a particular point in the replay of the prior execution of the entity;
suspending the replay of the entity;
identifying a runtime data element used by the entity at the particular point, the runtime data element having a first value based on the replayed execution; and
receiving input specifying a second, different, value for the runtime data element; and
performing a tentative replay of the entity starting at the particular point using the one or more first trace data streams and using the second value for the runtime data element, while enabling the replay of the prior execution of the entity to be later resumed at the particular point unaffected by the tentative replay, including:
setting the runtime data element to the second value;
utilizing the one or more first trace data streams to supply inputs to the entity; emulating one or more memory writes performed by the entity during the tentative replay; and
detecting that the tentative replay has deviated from the prior execution and can no long continue using the one or more first trace data streams for the tentative replay, based on determining that the entity has requested data from the one or more first trace data streams during the tentative replay that is not available in the one or more trace data streams.

14. The method of claim 13, wherein performing the tentative replay of the entity also includes recording the tentative replay of the entity into one or more second trace data streams.

15. The method of claim 13, wherein performing the replay of the prior execution of the entity also includes recording the replay of the prior execution of the entity into one or more second trace data streams.

16. The method of claim 13, wherein performing the tentative replay of the entity comprises presenting, to the entity during the tentative replay, a memory space used by the entity during the replay of the prior execution of the entity.

17. The method of claim 16, wherein emulating one or more memory writes performed by the entity during the tentative replay comprises one or more of:
- redirecting a target memory address to a memory addresses not used by the replay of the prior execution of the entity; or
- saving an existing value at a destination memory address, and restoring the existing value when resuming the replay of the prior execution of the entity.

18. The method of claim 13, further comprising ceasing the tentative replay of the entity based on detecting that the tentative replay has deviated from the prior execution.

19. The method of claim 13, further comprising prompting a user for an input of the requested data.

20. A computer program product comprising one or more hardware storage devices having stored thereon computer-executable instructions that are executable by one or more processors to configure a computer system to tentatively execute a traced entity, the computer-executable instructions including instructions that are executable to configure the computer system to perform at least the following:
- replay a prior execution of an entity, the replay of the prior execution being based on utilizing one or more first trace data streams to supply inputs to the entity, the one or more first trace data streams recorded during the prior execution of the entity;
- at a particular point in the replay of the prior execution of the entity;
- suspend the replay of the prior execution of the entity;
- identify a runtime data element used by the entity at the particular point, the runtime data element having a first value based on the replayed execution; and
- receive input specifying a second, different, value for the runtime data element; and
- perform a tentative replay of the entity starting at the particular point using the one or more first trace data streams and using the second value for the runtime data element, while enabling the replay of the prior execution of the entity to be later resumed at the particular point unaffected by the tentative replay, including:
  - setting the runtime data element to the second value;
  - utilizing the one or more first trace data streams to supply inputs to the entity;
  - emulating one or more memory writes performed by the entity during the replay; and
  - detect that the tentative replay has deviated from the prior execution and can no long continue using the one or more first trace data streams for the tentative replay, based on determining that the entity has requested data from the one or more first trace data streams during the tentative replay that is not available in the one or more first trace data streams.

* * * * *